US010666944B2

(12) United States Patent
Navarrete Michelini et al.

(10) Patent No.: US 10,666,944 B2
(45) Date of Patent: May 26, 2020

(54) IMAGE ENCODING/DECODING APPARATUS, IMAGE PROCESSING SYSTEM, IMAGE ENCODING/DECODING METHOD AND TRAINING METHOD

(71) Applicant: BOE TECHNOLOGY GROUP CO., LTD., Beijing (CN)

(72) Inventors: Pablo Navarrete Michelini, Beijing (CN); Xiaoyu Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 214 days.

(21) Appl. No.: 15/745,091

(22) PCT Filed: Jun. 27, 2017

(86) PCT No.: PCT/CN2017/090260
§ 371 (c)(1),
(2) Date: Jan. 16, 2018

(87) PCT Pub. No.: WO2018/068532
PCT Pub. Date: Apr. 19, 2018

(65) Prior Publication Data
US 2019/0014320 A1 Jan. 10, 2019

(30) Foreign Application Priority Data
Oct. 11, 2016 (CN) .......................... 2016 1 0885633

(51) Int. Cl.
G06N 3/04 (2006.01)
H04N 19/124 (2014.01)
(Continued)

(52) U.S. Cl.
CPC ......... H04N 19/124 (2014.11); G06N 3/0454 (2013.01); G06N 3/08 (2013.01);
(Continued)

(58) Field of Classification Search
CPC ...... G06N 3/0454; G06N 3/08; H04N 19/117; H04N 19/124; H04N 19/14; H04N 19/154;
(Continued)

(56) References Cited

U.S. PATENT DOCUMENTS 6,738,523 B1* 5/2004 Small ................... G06F 17/148
348/398.1
9,445,110 B2* 9/2016 Leontaris ............... H04N 19/80
(Continued)

FOREIGN PATENT DOCUMENTS

CN 101039419 A 9/2007
CN 102510489 A 6/2012
(Continued)

OTHER PUBLICATIONS

Claypoole et al. ("Nonlinear wavelet transforms for image coding via lifting," IEEE Transactions on Image Processing, vol. 12, No. 12, Dec. 2003) (Year: 2003).*
(Continued)

Primary Examiner — Yubin Hung
(74) Attorney, Agent, or Firm — Collard & Roe, P.C.

(57) ABSTRACT

Provided are an image encoding method, an image decoding method and an image processing system including image encoding/decoding apparatus. The image encoding method includes steps of: acquiring a first image and a plurality of second images; updating features of each second image of the plurality of second images to obtain corresponding update features; superposing the first image with the update features of each second image of the plurality of second images to generate superposed images; generating a plurality of prediction images according to the superposed images; determining difference features between each second image of the plurality of second images and a corresponding (Continued)

prediction image; outputting the superposed images and the difference features; wherein the updating and/or predicting adopts a convolutional neural network.

20 Claims, 7 Drawing Sheets

(51) Int. Cl.
| | |
|---|---|
| H04N 19/192 | (2014.01) |
| H04N 19/593 | (2014.01) |
| G06N 3/08 | (2006.01) |
| H04N 19/117 | (2014.01) |
| H04N 19/14 | (2014.01) |
| H04N 19/61 | (2014.01) |
| H04N 19/63 | (2014.01) |
| H04N 19/154 | (2014.01) |
| H04N 19/635 | (2014.01) |

(52) U.S. Cl.
CPC ........... *H04N 19/117* (2014.11); *H04N 19/14* (2014.11); *H04N 19/154* (2014.11); *H04N 19/192* (2014.11); *H04N 19/593* (2014.11); *H04N 19/61* (2014.11); *H04N 19/63* (2014.11); *H04N 19/635* (2014.11)

(58) Field of Classification Search
CPC .... H04N 19/192; H04N 19/593; H04N 19/61; H04N 19/63; H04N 19/635
See application file for complete search history.

(56) References Cited

U.S. PATENT DOCUMENTS

| | | | |
|---|---|---|---|
| 2001/0011290 A1* | 8/2001 | Kovacevic | G06T 3/4007 708/308 |
| 2005/0249425 A1* | 11/2005 | Paniconi | H04N 19/172 382/240 |
| 2006/0008164 A1 | 1/2006 | Wu et al. | |
| 2006/0262860 A1* | 11/2006 | Chou | H04N 19/176 375/240.24 |
| 2007/0217513 A1 | 9/2007 | Lopez et al. | |
| 2009/0003435 A1* | 1/2009 | Cho | H04N 19/46 375/240.1 |
| 2010/0215103 A1* | 8/2010 | Yin | H04N 19/105 375/240.16 |
| 2011/0182358 A1* | 7/2011 | Kim | H04N 19/635 375/240.12 |
| 2012/0250760 A1* | 10/2012 | Schwarz | H04N 19/56 375/240.03 |

FOREIGN PATENT DOCUMENTS

| | | |
|---|---|---|
| CN | 105611303 A | 5/2016 |
| CN | 205408063 U | 7/2016 |

OTHER PUBLICATIONS

International Search Report of PCT/CN2017/090260 in Chinese, dated Sep. 20, 2017 with English translation.
Notice of Transmittal of the International Search Report of PCT/CN2017/090260 in Chinese, dated Sep. 20, 2017.
Written Opinion of the International Searching Authority of PCT/CN2017/090260 in Chinese, dated Sep. 20, 2017 with English translation.

* cited by examiner

IMAGE ENCODING/DECODING APPARATUS, IMAGE PROCESSING SYSTEM, IMAGE ENCODING/DECODING METHOD AND TRAINING METHOD

CROSS-REFERENCE TO RELATED APPLICATION

This application is the National Stage of PCT/CN2017/090260 filed on Jun. 27, 2017, which claims priority under 35 U.S.C. § 119 of a Chinese patent application No. 201610885633.4 filed on Oct. 11, 2016, which is hereby incorporated by reference in its entirety as a part of the present application.

TECHNICAL FIELD

The present disclosure relates to an image encoding apparatus, an image decoding apparatus, an image processing system comprising the image encoding/decoding apparatus, a training method for the image processing system and a display apparatus.

BACKGROUND

In recent years, the quality of digital images and videos is improved quickly with standards such as BT.2020 established. The improvement in image quality is tied to a significant increase in data size. At the same time, the most popular source of media comes from the Internet. It is expected that even though bandwidth is increasing steadily, a dramatic increase in media data traffic is hard to be satisfied. Therefore, it needs to seek for better solutions for media data compression to satisfy the requirement for high quality media data under the existing traffic bandwidth.

SUMMARY

According to one aspect of the present disclosure, there is provided in an embodiment of the present disclosure an image encoding apparatus, comprising: a first image input terminal, configured to provide a first image; a plurality of second image input terminals, configured to provide a plurality of second images; a first convolutional neural network circuit connected with the plurality of second image input terminals and configured to update features of each second image of the plurality of second images to obtain corresponding update features; an image superposing circuit, connected with the first image input terminal and the first convolutional neural network circuit and configured to superpose the update feature of each second image of the plurality of second images with the first image to generate superposed images and output the superposed images; a prediction circuit, connected with the image superposing circuit and configured to generate a plurality of prediction images according to the superposed images; an image difference acquisition circuit, connected with the plurality of second image input terminals and the prediction circuit and configured to determine difference features between each second image of the plurality of second images and the corresponding prediction image and output the difference features; and an output interface, configured to output the superposed images and the difference features.

Optionally, in the image encoding apparatus, the prediction circuit is a second convolutional neural network circuit.

According to another aspect of the present disclosure, there is provided an image encoding apparatus, comprising: a first image input terminal, configured to acquire a first image; a plurality of second image input terminals, configured to acquire a plurality of second images; a feature circuit, connected with the plurality of second image input terminals and configured to update features of each second image of the plurality of second images to obtain corresponding update features; an image superposing circuit, connected with the first image input terminal and the feature circuit and configured to superpose the update features of each second image of the plurality of second images with the first image to generate superposed images and output the superposed images; a second convolutional neural network circuit, connected with the image superposing circuit and configured to generate a plurality of prediction images according to each of the superposed images; an image difference acquisition circuit, connected with the plurality of second image input terminals and the prediction circuit and configured to determine difference features between each second image of the plurality of second images and a corresponding prediction image and output the difference features; and an output interface, configured to output the superposed images and the difference features.

Optionally, the image encoding apparatus further comprises: a demuxer, connected with the first image input terminal and the plurality of second image input terminals and configured to split an input original image to obtain the first image and the plurality of second images.

Optionally, in the image encoding apparatus described above, the image superposing circuit superposes the update features of each second image of the plurality of second images with the first image according to a superposing weight.

In the image encoding apparatus according to an embodiment of the present disclosure, the image superposing circuit is configured to multiply the first image by a first weight parameter to obtain a first product, multiply the update features by a second weight parameter to obtain a second product, and superpose the first product and the second product to generate superposed images; wherein the first weight parameter is greater than 0, and a sum of the first weight parameter and the second weight parameter is 1.

The image encoding apparatus according to an embodiment of the present disclosure further comprises: a demuxer, connected with the first image input terminal and the plurality of second image input terminals and configured to split an input original image to obtain the first image and the plurality of second images.

Optionally, in the image encoding apparatus according to an embodiment of the present disclosure, the demuxer is configured to split the original image into 2n images, a number of the first image is 1, a number of the second images is 2n−1, and n is an integer greater than 0.

According to another aspect of the present disclosure, there is provided in an embodiment of the present disclosure an image decoding apparatus, comprising: a superposed image input terminal, configured to receive superposed images; a difference feature input terminal, configured to receive difference features; a prediction circuit, connected with the superposed image input terminal and configured to generate a plurality of prediction images according to the superposed images; a de-difference circuit, connected with the difference feature input terminal and the prediction circuit and configured to generate a plurality of second images according to the plurality of prediction images and the difference features and output the plurality of second images; a fourth convolutional neural network circuit, connected with the de-difference circuit and configured to update each second image of the plurality of second images to obtain a corresponding update feature; and an image de-superposing circuit, connected with the superposed image input terminal and the fourth convolutional neural network circuit and configured to perform de-superposing on the superposed images according to the update features to obtain a first image, and output the first image; an output terminal, configured to output the plurality of second images and the first image.

Optionally, in the image decoding apparatus, the prediction circuit is a third convolutional neural network circuit.

According to another aspect of the present disclosure, there is provided an image decoding apparatus, comprising: a superposed image input terminal, configured to receive superposed images; a difference feature input terminal, configured to receive difference features; a third convolutional neural network circuit, connected with the superposed image input terminal and configured to generate a plurality of prediction images according to the superposed images; a de-difference circuit, connected with the difference feature input terminal and the third convolutional neural network and configured to generate a plurality of second images according to each prediction image of the plurality of prediction images and the difference features and output the plurality of second images; a feature circuit, connected with the de-difference circuit and configured to update each second image of the plurality of second images to obtain a corresponding update feature; and an image de-superposing circuit, connected with the superposed image input terminal and the feature circuit and configured to perform de-superposing on the superposed images according to the update features to obtain a first image, and output the first image; and an output terminal, configured to output the plurality of second images and the first image.

Optionally, the image decoding apparatus further comprises: a muxer, connected with the output terminal and configured to split joint the first image and the plurality of second images to obtain a decoded image and output the decoded image through an output interface.

Optionally, in the above-mentioned image decoding apparatus, the image de-superposing circuit is configured to perform de-superposing on the superposed images according to the update features and their superposing weights.

In the image decoding apparatus according to an embodiment of the present disclosure, the image de-superposing circuit is configured to multiply the update features by a second weight parameter to obtain a second product, remove the second product from the superposed images to obtain a first product, and divide the first product by a first weight parameter to obtain the first image; wherein the first weight parameter is greater than 0, and a sum of the first weight parameter and the second weight parameter is 1.

According to another aspect of the present disclosure, there is provided in an embodiment of the present disclosure an image processing system, comprising: an image encoding apparatus, comprising: a first image input terminal, configured to acquire a first image; a plurality of second image input terminals, configured to acquire a plurality of second images; a first convolutional neural network circuit, connected with the plurality of second image input terminals and configured to update features of each second image of the plurality of second images to obtain corresponding update features; an image superposing circuit, connected with the first image input terminal and the first convolutional neural network circuit and configured to superpose the update features of each second image of the plurality of second images with the first image to generate superposed images and output the superposed images; a first prediction circuit, connected with the image superposing circuit and configured to generate a plurality of prediction images according to each of the superposed images; an image difference acquisition circuit, connected with the plurality of second image input terminals and the prediction circuit and configured to determine difference features between each of the plurality of second images and a corresponding prediction image and output the difference features; and an output interface, configured to output the superposed images and the difference features; an image decoding apparatus, comprising: a superposed image input terminal, configured to receive the superposed images; a difference feature input terminal, configured to receive the difference features; a second prediction circuit, connected with the superposed image input terminal and configured to generate a plurality of prediction images according to the superposed images; a de-difference circuit, connected with the difference feature input terminal and the prediction circuit and configured to generate a plurality of fourth images according to each prediction image of the plurality of prediction images and the difference features and output the plurality of fourth images; a fourth convolutional neural network circuit, connected with the de-difference circuit and configured to update the plurality of fourth images to obtain corresponding update features; and an image de-superposing circuit, connected with the superposed image input terminal and the fourth convolutional neural network circuit and configured to perform de-superposing on the superposed images according to the update features to obtain a third image, and output the third image; and an output terminal, configured to output the plurality of fourth images and the third image.

Optionally, in the image processing system described above, the first prediction circuit is a second convolutional neural network circuit, and the second prediction circuit is a third convolutional neural network circuit.

According to another aspect of the present disclosure, there is provided an image processing system, comprising: an image encoding apparatus, comprising: a first image input terminal, configured to acquire a first image; a plurality of second image input terminals, configured to acquire a plurality of second images; a first feature circuit, connected with the plurality of second image input terminals and configured to update features of each second image of the plurality of second images to obtain corresponding update features; an image superposing circuit, connected with the first image input terminal and the first feature circuit and configured to superpose the update feature of each second image of the plurality of second images with the first image to generate superposed images and output the superposed images; a second convolutional neural network circuit, connected with the image superposing circuit and configured to generate a plurality of prediction images according to each of the superposed images; an image difference acquisition circuit, connected with the plurality of second image input terminals and the second convolutional neural network circuit and configured to determine difference features between each second image of the plurality of second images and a corresponding prediction image and output the difference features; and an output interface, configured to output the superposed images and the difference features; an image decoding apparatus, comprising: a superposed image input terminal, configured to receive the superposed images; a difference feature input terminal, configured to receive the difference features; a third convolutional neural network circuit, connected with the superposed image input terminal and configured to generate a plurality of prediction images according to the superposed images; a de-difference circuit, connected with the difference feature input terminal and the third convolutional neural network circuit and configured to generate a plurality of fourth images according to each prediction image of the plurality of prediction images and the difference features and output the plurality of fourth images; a second feature circuit, connected with the de-difference circuit and configured to update the plurality of fourth images to obtain corresponding update features; and an image de-superposing circuit, connected with the superposed image input terminal and the second feature circuit and configured to perform de-superposing on the superposed images according to the update features to obtain a third image, and output the third image; and an output terminal, configured to output the plurality of fourth images and the third image.

Optionally, in the image processing system described above, the first feature circuit is a first convolutional neural network circuit, and the second feature circuit is a fourth convolutional neural network circuit.

Optionally, the image processing system further comprises a quantization apparatus, connected with the image encoding apparatus and configured to receive the superposed images and the difference features output from the output interface and perform quantization process and inverse quantization process on the superposed images and the difference features, to generate quantization superposed images and quantization difference features; and the image decoding apparatus, configured to output the quantization superposed image and the quantization difference features to a superposed image input terminal and a difference feature input terminal of the image decoding apparatus.

In the image processing system according to an embodiment of the present disclosure, the quantization apparatus is configured to perform the quantization process on the superposed images and the difference features by utilizing an uniform scalar quantization USQ function, $$USQ(x) = \text{sign}(x)\left\lfloor \frac{x}{\delta} \right\rfloor$$

where $$\text{sign}(x) = \begin{cases} 1 & x > 0 \\ 0 & x = 0 \\ -1 & x < 0 \end{cases}, \left\lfloor \frac{x}{\delta} \right\rfloor$$

is a smallest integer smaller than x, and $\delta$ is a quantization parameter.

In the image processing system according to an embodiment of the present disclosure, the quantization apparatus is configured to perform the quantization process on an output q of the uniform scalar quantization USQ function by utilizing an inverse uniform scalar quantization InvUSQ function to generate the quantization superposed images and the quantization difference features, where $\text{InvUSQ}(q) = \text{sign}(q)(|q|+0.5)\delta$.

According to another aspect of the present disclosure, there is provided an image encoding method, comprising steps of:

acquiring a first image and a plurality of second images;
updating features of each second image of the plurality of second images to obtain corresponding update features;

superposing the first image and the update features of each second image of the plurality of second images to generate superposed images;

generating a plurality of prediction images according to the superposed images;

determining difference features between each second image of the second images and a corresponding prediction image;

outputting the superposed images and the difference features;

wherein the updating and/or predicting adopts a convolutional neural network.

Optionally, the image encoding method further comprises steps of:

splitting an input original image into the first image and the plurality of second images.

According to another aspect of the present disclosure, there is provided an image decoding method, comprising steps of: receiving superposed images and difference features; generating a plurality of prediction images according to the superposed images; generating a plurality of second images according to each prediction image of the plurality of prediction images and the difference features; updating each second image of the plurality of second images to obtain corresponding update features; performing de-superposing on the superposed images according to the update features to obtain a first image; outputting the plurality of second images and the first image; wherein the updating and/or predicting adopts a convolutional neural network.

Optionally, the image decoding method further comprises a step of: joining the first image and the plurality of second images to obtain a decoded image.

According to another aspect of the present disclosure, there is provided in an embodiment of the present disclosure a training method for an image processing system, comprising: selecting a fixed quantization parameter; inputting a training image to the image processing system, adjusting weight values of respective filter circuits at respective convolutional layers in convolutional neural network circuits, and running a limited number of iterations to optimize a target function; and reducing the quantization parameter by a predetermined value, and repeating a training step of optimizing the target function if the quantization parameter is not smaller than a predetermined threshold; otherwise, the training method ends up.

In the training method according to an embodiment of the present disclosure, the target function is:

$$\theta = \arg_\theta \min_X \text{MSE}(X, \text{OUT}_\theta(X,\delta))$$

where X represents an input training image, OUT represents an output image, and MSE is a mean square error function between the input training image and the output image.

According to another aspect of the present application, there is provided in an embodiment of the present disclosure a display apparatus, comprising the image encoding apparatus, the image decoding apparatus and/or the image processing system described above.

BRIEF DESCRIPTION OF THE DRAWINGS

The above and other purposes, features and advantages of the present disclosure would become more evident by describing embodiments of the present disclosure in more details in combination with accompanying drawings. In the drawings, same reference marks generally represent same means or step.

DETAILED DESCRIPTION

In order to make principles, technical solutions and advantages of the present disclosure more evident, exemplary embodiments according to the present disclosure will be described below in detail by referring to the accompanying drawings. Obviously, the embodiments described below are just a part of embodiments of the present disclosure, rather than all the embodiments of the present disclosure. It shall be understood that the present disclosure is not limited to the exemplary embodiments described herein. Based on the embodiments of the present disclosure described in the present disclosure, all the other embodiments obtained by those skilled in the art without paying any inventive labor shall fall into the protection scope of the present disclosure.

Before detailed description of an image encoding apparatus, an image decoding apparatus and an image processing system according to embodiments of the present disclosure, basic concepts of a convolutional neural network being used for image encoding/decoding process are described by referring to the accompanying drawings.

Figure 1:
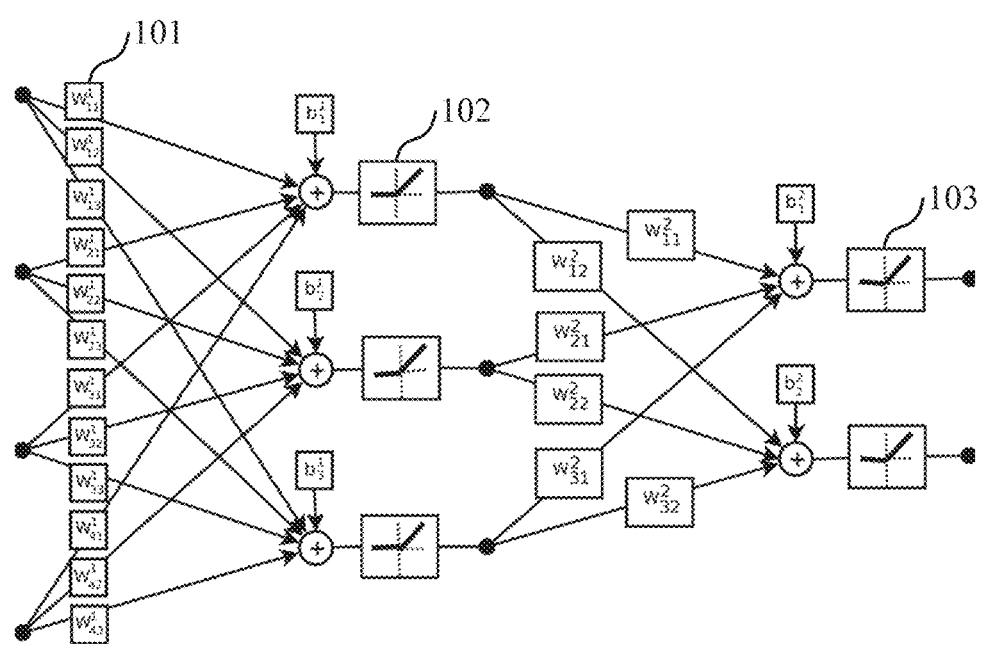
FIG. 1 is a schematic diagram illustrating a convolutional neural network for image processing.

FIG. 1 illustrates a schematic diagram of a convolutional neural network used for image processing. The convolutional neural network used for image processing uses images as inputs/outputs and replaces scalar weights by filters (convolutions). FIG. 1 shows a convolutional neural network having a simple structure with 3 layers. As shown in FIG. 1, 4 input images are input at an input layer 101, there are 3 units at a hidden layer 102 in the center to output 3 output images, and there are 2 units at an output layer 103 to output 2 output images. Each box with weights $w_{ij}^k$ at the input layer 101 corresponds to a filter, where k is a label indicating an input layer number, and i and j are labels indicating input and output units, respectively. The biases $b_i^k$ are scalars added to the outputs of convolutions. The result of adding several convolutions and bias then passes through an activation box, that typically corresponds to a rectifying linear unit (ReLU), or sigmoid function, or hyperbolic tangent, etc. In the image processing system using the convolutional neural network, the respective filters and biases are fixed during operation of the system. The filters and biases are obtained by a process of training using a set of input/output example images in advance and adjusted to fit some optimization criterion that depends on applications.

Figure 2:
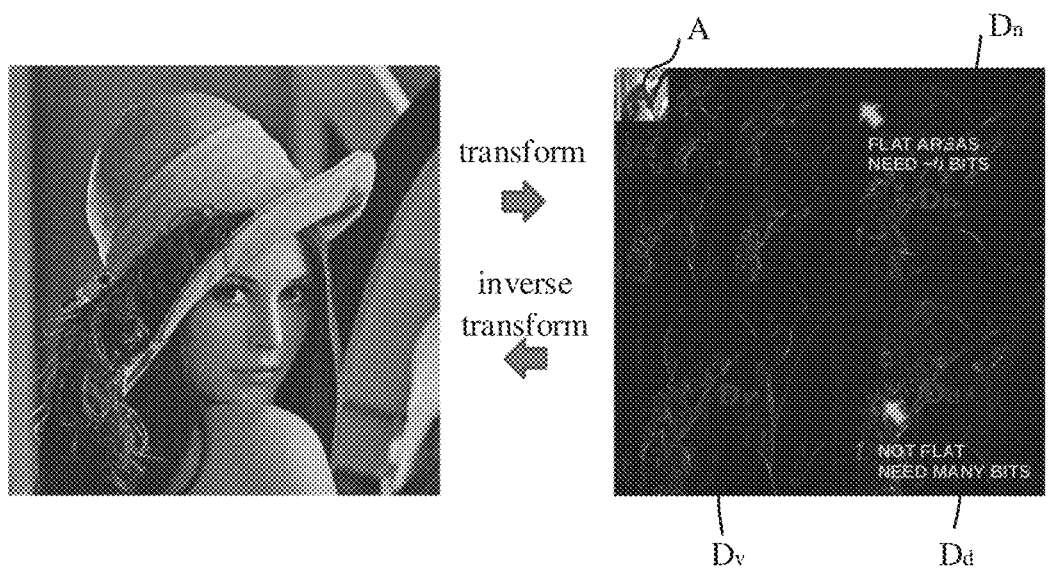
FIG. 2 is a schematic diagram illustrating a wavelet transform for a multi-resolution image transform.

FIG. 2 is a schematic diagram illustrating a wavelet transform for a multi-resolution image transform. Wavelet Transform is a multi-resolution image transform for image encoding/decoding process. Applications of wavelet transform include transform coding in JPEG 2000 standard. In the image encoding (compression) process, the wavelet transform is used to represent an original high-resolution image in terms of smaller low-resolution images (for example, a part of images of the original images). In the image decoding (decompression) process, an inverse wavelet transform is used to recover and obtain the original image by utilizing a low-resolution image and the difference features required for recovering the original image.

FIG. 2 schematically shows a 3-level wavelet transform and inverse transform. As shown in FIG. 2, one of the smaller low-resolution images is a downscale version A of the original image, and the other low-resolution images represent the missing details (Dn, Dv and Dd) needed to recover the original image.

Figure 3:
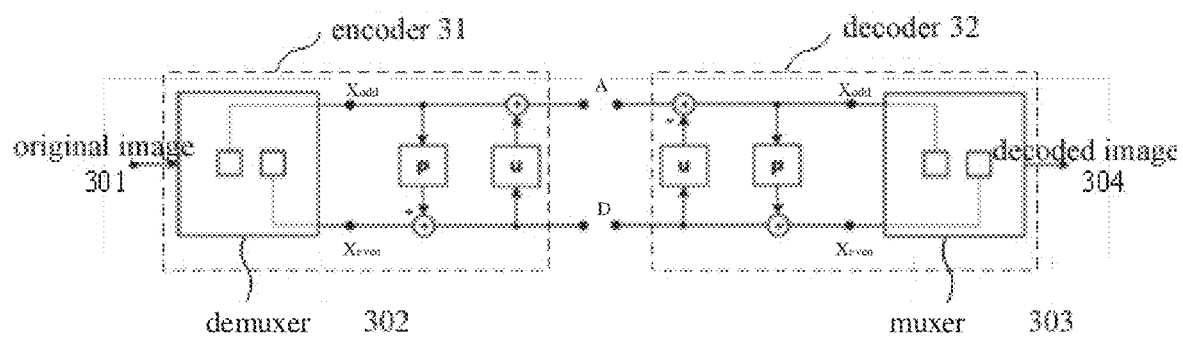
FIG. 3 is a schematic diagram of structure of an image processing system that utilizes a convolutional neural network to realize a wavelet transform.

FIG. 3 is a schematic diagram of structure of an image processing system that utilizes a convolutional neural network to realize a wavelet transform. Lifting Scheme is an efficient implementation of the wavelet transform and a flexible tool for constructing wavelets. A standard structure for 1D data is shown illustratively in FIG. 3. The left side in FIG. 3 corresponds to an encoder 31. A demuxer 302 in the encoder 31 transforms an input original image 301 into a low-resolution image A and detail D. The encoder 31 further uses a prediction filter p and an update filter u. For a compression application, it is desired that D≈0, so that most information is contained in A. The right side in FIG. 3 corresponds to a decoder 32. The parameters of the decoder 32 are exactly the same filters p and u from the encoder 31, but the filters p and u are arranged inversely. Since the encoder 31 and the decoder 32 are corresponding strictly, this arrangement ensures that a decoded image 304 joined and obtained by the muxer 303 of the decoder is exactly the same as the original image 301. In addition, the structure shown in FIG. 3 is not limited, and can be configured alternatively in the decoder according to a sequence of an update filter u and a prediction filter p.

An image encoding apparatus, an image decoding apparatus and an image processing system comprising the image encoding/decoding apparatus according to embodiments of the present disclosure will be described in detail by referring to the accompanying drawings.

Figure 4:
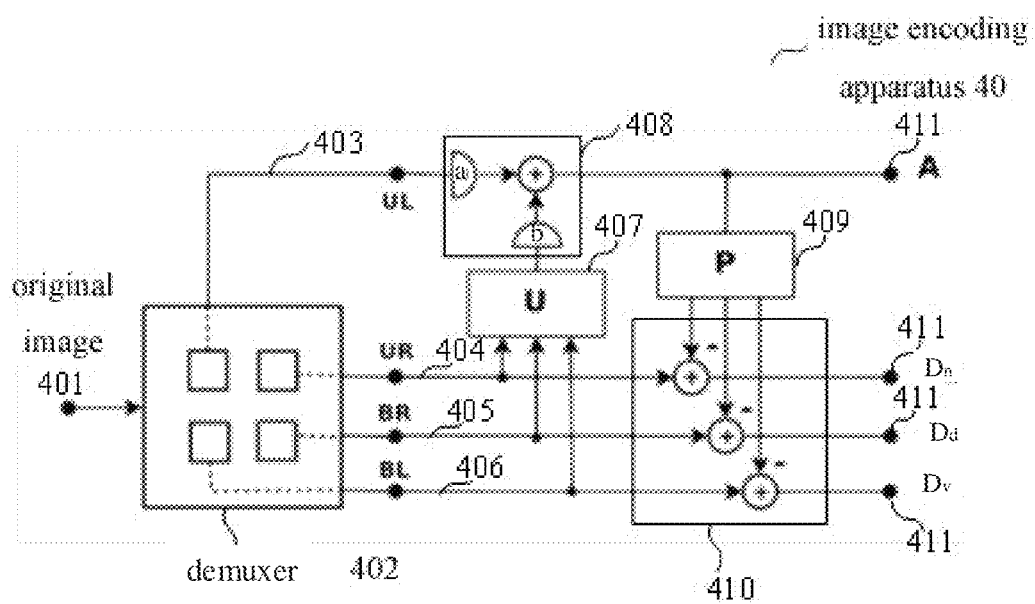
FIG. 4 is a schematic diagram illustrating structure of an image encoding apparatus according to a first embodiment of the present disclosure.

FIG. 4 is a schematic diagram illustrating structure of an image encoding apparatus according to a first embodiment of the present disclosure.

As shown in FIG. 4, an image encoding apparatus 40 according to the first embodiment of the present disclosure comprises:

a demuxer 402, configured to split an input original image to obtain a first image UL and a plurality of second images UR, BR, BL.

A first image input terminal 403 is configured to receive the first image UL from the demuxer 402. A plurality of second image input terminals 404, 405, 406 is configured to receive the plurality of second images UR, BR, BL from the demuxer 402, respectively.

A first convolutional neural network 407 is connected with the plurality of second image input terminals 404, 405, 406, and configured to update the plurality of second images UR, BR, BL to obtain corresponding update features.

In the first embodiment of the present disclosure, the first convolutional neural network circuit 407 can be an update filter described by referring to FIG. 3.

An image superposing circuit 408 is connected with the first image input terminal 403, the first convolutional neural network circuit 407 and an output interface 411 and configured to superpose the update features U and the first image UL according to a superposing weight to generate superposed image A, and output the superposed image A through the output interface 411.

In an embodiment of the present disclosure, the image superposing circuit 408 is configured to multiply the first image UL by a first weight parameter a to obtain a first product, multiply the update features U by a second weight parameter b to obtain a second product, and superpose the first product and the second product to generate the superposed image A. The first weight parameter a is greater than 0, and a sum of the first weight parameter a and the second weight parameter b is 1. That is, in the image superposing circuit 408:

$$A = aUL + bU \qquad \text{Expression 1}$$

$$a+b=1 \text{ and } a>0 \qquad \text{Expression 2}$$

A second convolutional neural network circuit 409 is connected with the image superposing circuit 408 and configured to generate a plurality of prediction images according to the superposed image A.

An image difference acquisition circuit 410 is connected with the plurality of second image input terminals 404, 405, 406, the second convolutional neural network circuit 409 and the output interface 411 and configured to determine difference features $D_n$, $D_d$ and $D_v$ of each second image of the plurality of second images UR, BR, BL and corresponding prediction images, and output the difference features $D_n$, $D_d$ and $D_v$ through the output interface 411.

In the first embodiment of the present disclosure, a compression circuit of the image encoding apparatus 40 is composed of the first convolutional neural network circuit 407, the image superposing circuit 408, the second convolutional neural network circuit 409 and the image difference acquisition circuit 410. The compression circuit performs image compression based on lifting scheme of the wavelet transform on the first image UL and the plurality of second images UR, BR, BL input from the demuxer 402.

Figure 5:
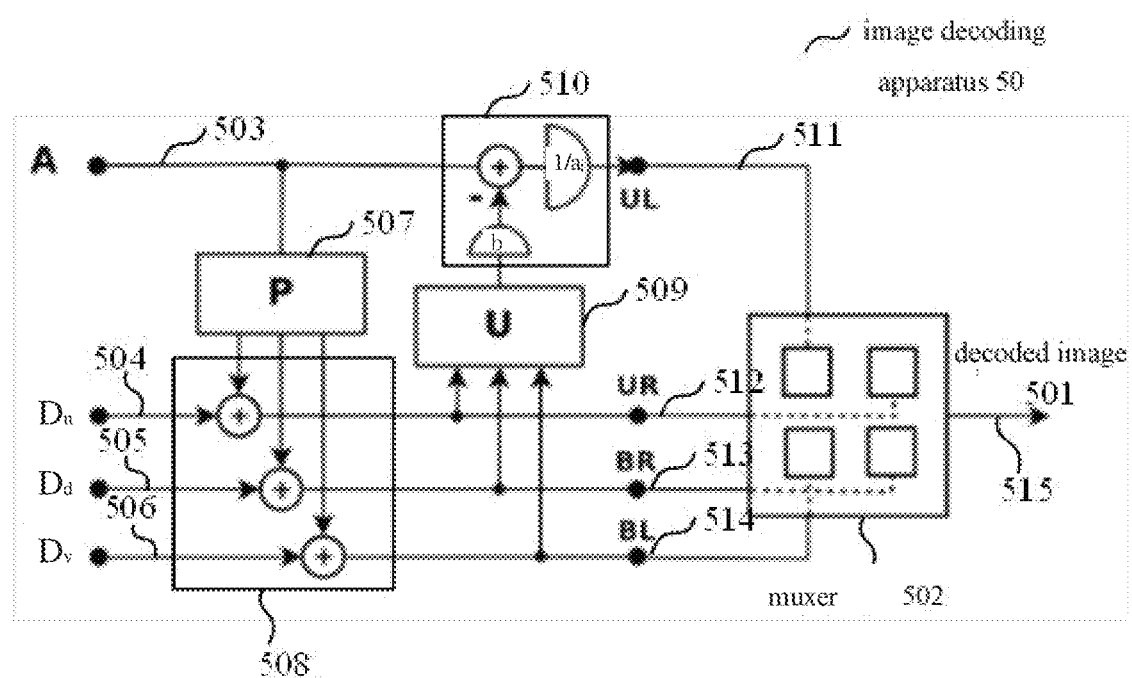
FIG. 5 is a schematic diagram illustrating structure of an image decoding apparatus according to a first embodiment of the present disclosure.

FIG. 5 is a schematic diagram illustrating structure of the image decoding apparatus according to the first embodiment of the present disclosure. The image decoding apparatus shown in FIG. 5 can be used to decode output images of the image encoding apparatus shown in FIG. 4.

As shown in FIG. 5, an image decoding apparatus 50 according to the first embodiment of the present disclosure comprises:

a superposed image input terminal 507, configured to receive the superposed image A. Difference feature input terminals 504, 505 and 506 are configured to receive the difference features $D_n$, $D_d$ and $D_v$ respectively. The superposed image A can be image data that comes from the image superposing circuit 408 and output from the output interface 411 of the image encoding apparatus 40 shown in FIG. 4. The difference features $D_n$, $D_d$ and $D_v$ can be image data that comes from the image difference acquisition circuit 410 and output from the output interface 411 of the image encoding apparatus 40 shown in FIG. 4.

A third convolutional neural network circuit 507 is connected with the superposed image input terminal 507 and configured to generate a plurality of prediction images according to the superposed image A.

A de-difference circuit 508 is connected with the difference feature input terminals 504, 505 and 506, the third convolutional neural network circuit 507 and output terminals 512, 523 and 514, and configured to generate a plurality of second images UR, BR, BL according to the plurality of prediction images and the difference features $D_n$, $D_d$ and $D_v$, and output the plurality of second images through the output terminals 512, 513 and 514.

A fourth convolutional neural network circuit 509 is connected with the de-difference circuit 508 and configured to update the plurality of second images to obtain corresponding update features U.

An image de-superposing circuit 510 is connected with the superposed image input terminal 503, the fourth convolutional neural network circuit 509 and the output terminal 511 and configured to perform de-superposing on the superposed image A according to the update features U and their superposing weights to obtain the first image UL, and output the first image UL through the output terminal 511.

In an embodiment of the present disclosure, the image de-superposing circuit 510 is configured to multiply the update features U by the second weight parameter b to obtain a second product bU, remove the second product from the superposed image A to obtain a first product (A-bU), and divide the first product (A-bU) by the first weight parameter a to obtain the first image UL; where the first weight parameter is greater than 0, and a sum of the first weight parameter and the second weight parameter is 1. That is, in the image superposing circuit 510:

$$UL = (A-bU)/a \qquad \text{Expression 3}$$

$$a+b=1 \text{ and } a>0 \qquad \text{Expression 4}$$

That is to say, the image de-superposing circuit 510 and the image superposing circuit 408 perform inverse processing, wherein the first weight parameter and the second weight parameter satisfy a same condition. Thus, the first image UL output by the image de-superposing circuit 510 can be the same as the first image obtained and split from the original image.

A muxer 502 is connected with respective output terminals 511-514 and the output interfaces 515 and configured to join the first image UL and the plurality of second images UR, BR, BL to obtain a decoded image 501, and the decoded image 501 is output through the output interface 515.

As described above, the third convolutional neural network circuit 507 and the fourth convolutional neural network circuit 509 in the image decoding apparatus 50 shown in FIG. 5 have the same filter parameter as the second convolutional neural network circuit 409 and the first convolutional neural network circuit 407 in the image encoding apparatus 40 shown in FIG. 4, and the de-superposing process performed by the image de-superposing circuit 510 in the image decoding apparatus 50 shown in FIG. 5 is completely inverse to the superposing process performed by the image superposing circuit 408 in the image encoding apparatus 40 shown in FIG. 4, and the de-difference process performed by the de-difference circuit 508 in the image decoding apparatus 50 shown in FIG. 5 is completely inverse to the difference acquisition process performed by the image difference acquisition circuit 410 in the image encoding apparatus 40 shown in FIG. 4, that is, an image encoded and compressed by the image encoding apparatus 40 shown in FIG. 4 can be decoded and recovered exactly by the image decoding apparatus 50 shown in FIG. 5, having nothing to do with the filter parameters of the respect convolutional neural networks.

In the first embodiment of the present disclosure, the updating process is completed by the first convolutional neural network circuit 407, and the prediction process is completed by the second convolutional neural network circuit 409. In specific applications, by performing corresponding training on the first convolutional neural network circuit 407 and the second convolutional neural network circuit 409, the first convolutional neural network circuit 407 and the second convolutional neural network circuit 409 have optimized filter parameters, so that the image encoding apparatus has a higher compression rate, without artificially setting corresponding filter parameters, which reduces complexity in setting the filter parameters.

In the first embodiment of the present disclosure, a weight parameter a used for image superposing is set, so as to further enhance downscaling and upscaling performance and flexibility of the encoder and the decoder.

Additionally, in the first embodiment of the present disclosure, based on appropriate training, the output difference features $D_n$, $D_d$ and $D_v$ are approximately 0, and the overall compression rate can be close to 75%. In splitting process performed by the demuxer 402 shown in FIG. 4, the images UR, BR and BL are predicted by the first image UL at the upper left side. The present disclosure is not limited thereto. In an alternative embodiment, the images UR, BR and BL can also be used as the first image to predict other images. In addition, in the first embodiment of the present disclosure, the number of the first image is 1. The present disclosure is not limited thereto. In an alternative embodiment, two images can also be used to predict two images, or three images can be used to predict three images. Since the number of obtained superposed images is the same as the number of the first images, in the case of only one image compression circuit, if adopting two images to predict two images, the theoretical maximum value of the compression rate is 50%, and if adopting three images to predict three images, the theoretical maximum value of the compression rate is 25%.

In the first embodiment of the present disclosure, a single-stage compression system composed of the first convolutional neural network circuit 407 and the second convolutional neural network circuit 409 is used. The present disclosure is not limited thereto. In an alternative embodiment, two stages and more stages of compression configuration can be used.

As described above, the image decoding apparatus 50 shown in FIG. 5 accurately decodes and recovers the images encoded and compressed by the image encoding apparatus 40 shown in FIG. 4, that is, the image encoding apparatus 40 shown in FIG. 4 and the image decoding apparatus 50 shown in FIG. 5 are compose a lossless system. In actual applications, in the Standard such as JPEG2000, it needs to perform quantization process on the encoded data, and then approximate the quantized encoded data to being decoded, so as to form a lossy system on the whole.

Figure 6:
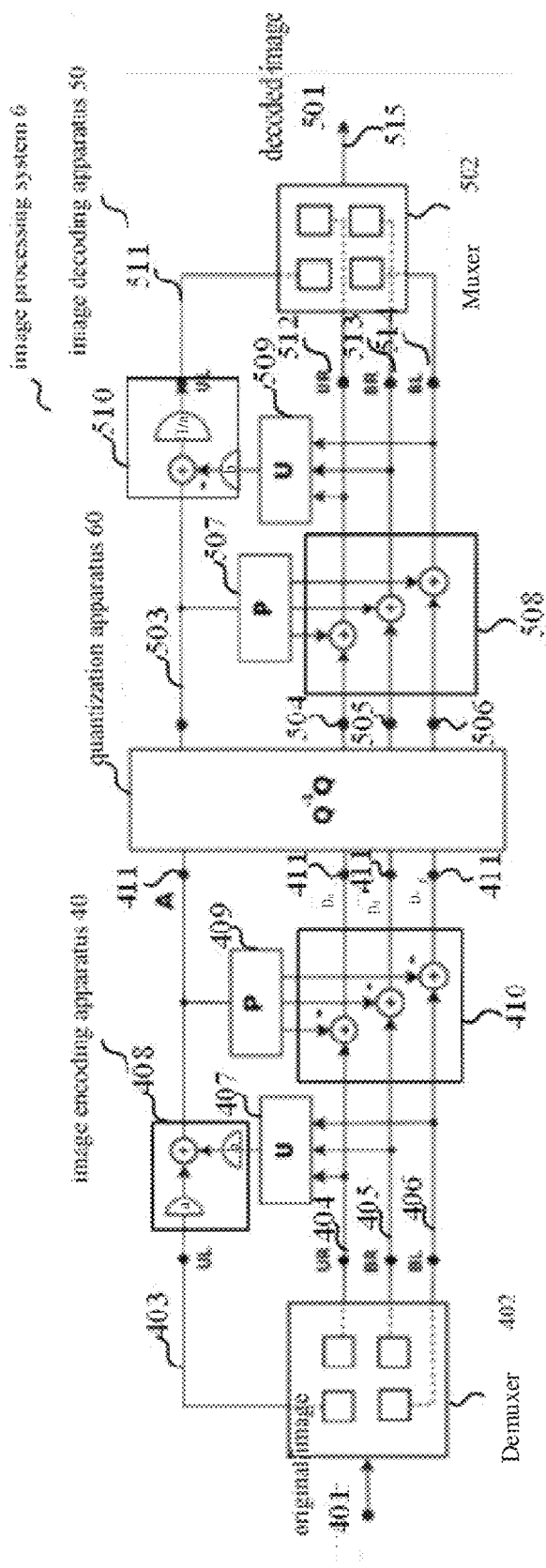
FIG. 6 is a schematic diagram illustrating structure of an image processing system according to a second embodiment of the present disclosure.

FIG. 6 is a schematic diagram illustrating structure of an image processing system according to the second embodiment of the present disclosure. An image processing system 6 according to the second embodiment of the present disclosure shown in FIG. 6 comprises the image encoding apparatus 40 shown in FIG. 4 and the image decoding apparatus 50 shown in FIG. 5, and the image processing system 6 according to the second embodiment of the present disclosure further comprises a quantization apparatus 60.

As shown in FIG. 6, the quantization apparatus 60 is connected with the image encoding apparatus 40 and the image decoding apparatus 50. The structure and inputs/outputs of the image encoding apparatus 40 in FIG. 6 are the same as the description by referring to FIG. 4, and thus the repetitive parts are omitted.

The quantization apparatus 60 is connected with the image encoding apparatus 40 and configured to receive the superposed image A and the difference features $D_n$, $D_d$ and $D_v$ output from the output interface 411, perform quantization process and inverse quantization process on the superposed image A and the difference features $D_n$, $D_d$ and $D_v$, to generate quantization superposed images and quantization difference features.

In particular, the quantization apparatus is configured to utilize the uniform scalar quantization USQ function to perform the quantization process on the superposed image and the difference features, $$USQ(x) = \text{sign}(x)\left\lfloor \frac{x}{\delta} \right\rfloor \qquad \text{Expression 5}$$

where $$\text{sign}(x) = \begin{cases} 1 & x > 0 \\ 0 & x = 0 \\ -1 & x < 0 \end{cases}, \left\lfloor \frac{x}{\delta} \right\rfloor$$

is the smallest integer smaller than x, and $\delta$ is a quantization parameter.

The quantization process represented by the Expression 5 complies with the JPEG 2000 standard.

According to the JPEG 2000 standard, the quantization apparatus is configured to utilize the inverse uniform scalar quantization InvUSQ function to perform the inverse quantization process on the output q of the uniform scalar quantization USQ function to generate the quantization superposed images and the quantization difference features, where $$\text{InvUSQ}(q) = \text{sign}(q)(|q|+0.5)\delta \qquad \text{Expression 6}$$

As described above, by performing the corresponding training on the convolutional neural network circuits in the encoding apparatus and the decoding apparatus, corresponding filter parameters can be set for the respective convolutional neural network circuits. For the image processing system according to the second embodiment shown in FIG. 6, since the quantization parameter $\delta$ is used, it needs to provide a training method which is capable of simultaneously training the respective convolutional neural network circuits and the quantization circuits in the encoding apparatus and the decoding apparatus.

Figure 7:
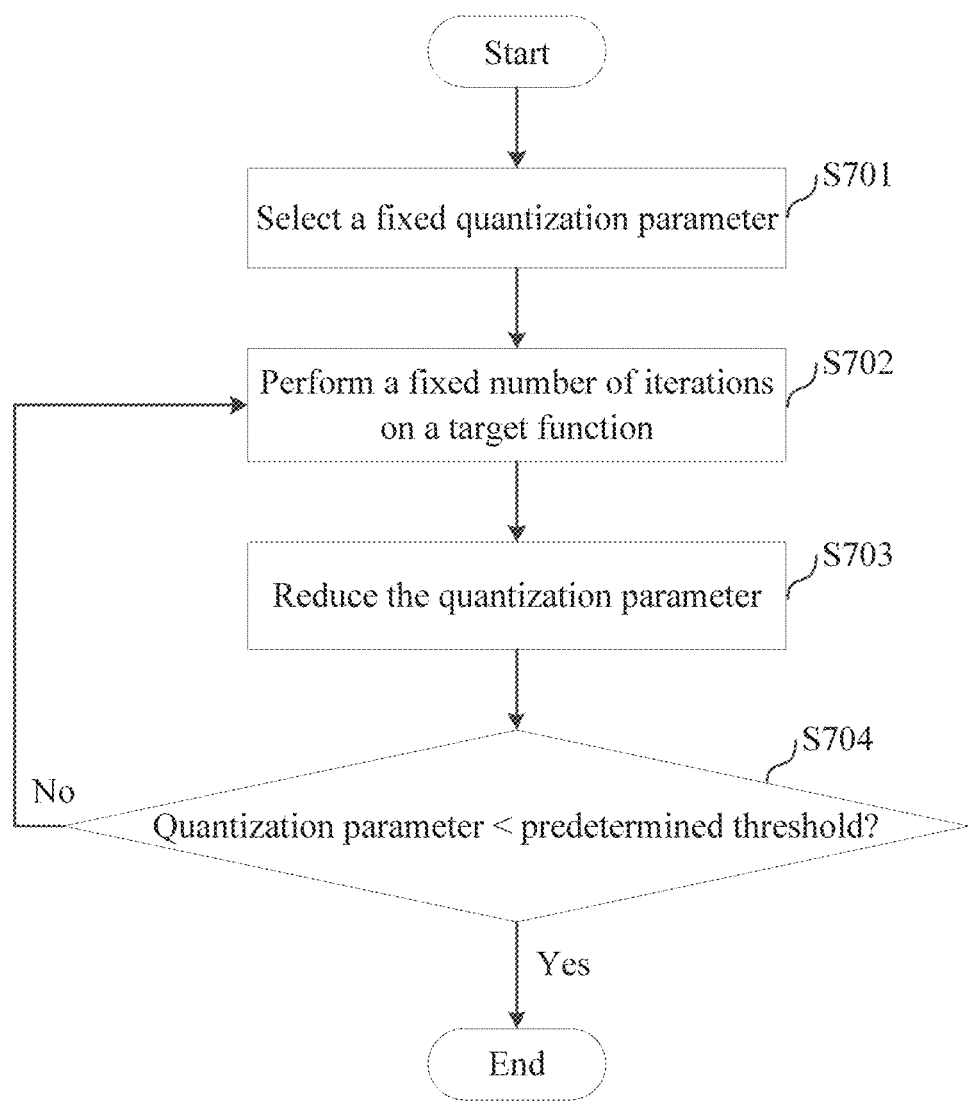
FIG. 7 is a flowchart diagram illustrating a training method according to a third embodiment of the present disclosure.

FIG. 7 illustrates a flowchart diagram of a training method according to a third embodiment of the present disclosure. As shown in FIG. 7, the training method according to the third embodiment of the present disclosure comprises following steps.

In step S701, a fixed quantization parameter $\delta$ is selected. In the third embodiment of the present disclosure, a relatively large initial value (e.g. 1000) of the quantization parameter $\delta$ is selected, so that the output is similar to lossless system and the optimization problem will be easy to solve. After that, the process moves to step S702.

In step S702, in the case of a fixed quantization parameter $\delta$, the training images are input to the image processing system, weight values of respective filter circuits at respective convolutional layers in the first to fourth convolutional neural network circuits are adjusted, and a fixed number of iterations are run to optimize a target function.

The target function is as follows:

$$\theta = \underset{\theta}{\mathrm{argmin}} MSE(X, OUT(X, \delta))  \quad \text{Expression 7}$$

θ represents a set of the weight values of the respective filter circuits at the respective convolutional layers in the convolutional neural network circuits, X represents input training images, OUT represents output images, and MSE is a mean square error function between the input training images and the output images. After that, the process moves to the step S703.

In step S703, the quantization parameter is reduced by a predetermined value. For example, the quantization parameter can be reduced by 5%. After that, the process moves to step S704.

In step S704, it is determined whether the quantization parameter is not smaller than the predetermined threshold. The predetermined threshold is determined in advance, e.g., 1.

If a positive result is obtained in step S704, i.e., the quantization parameter is not smaller than a predetermined threshold, then the process returns to the step S702 to repeat the training in step S702.

On the contrary, if a negative result is obtained in step S704, i.e., the quantization parameter is small enough, the training process ends up.

It can be seen from the training method according to the third embodiment of the present disclosure shown in FIG. 7, the training aim is to reduce both the MSE and the quantization parameter δ. If the MSE is 0, then the quantization parameter δ is very large; if the quantization parameter δ is very small, then the MSE is large. Therefore, in the training process, it needs to make an appropriate compromise between the MSE and the quantization parameter δ based on an acceptable quantization compression level and image quality.

Additionally, the image encoding/decoding apparatus and the image processing system as described above by referring to FIGS. 4-6 can be further used for the display apparatus according to an embodiment of the present disclosure. The display apparatus according to an embodiment of the present disclosure can be any product or means having the display function such as a mobile phone, a tablet computer, a television set, a display, etc.

The image encoding apparatus, the image decoding apparatus, the image processing system comprising the image encoding/decoding apparatus, the training method for the image processing system and the display apparatus are described above by referring to the accompanying figures. The image encoding apparatus, the image decoding apparatus, and the image processing system comprising the image encoding/decoding apparatus according to the present disclosure enhance the downscaling and upscaling performance and flexibility of the encoder and the decoder based on the new weight parameters, so as to further improve the performance of the overall system. In addition, the training method for the image processing system according to the present disclosure realizes higher compression performance by optimizing the compression efficiency of the overall system in the case of different quantization parameters.

In the above descriptions, the image encoding apparatus, the image decoding apparatus, the image processing system and the circuits involved therein can be implemented by a central processor (CPU), or respective apparatuses and circuits can be implemented by microprocessors such as a digital signal processor (DSP), a field programmable gate array (FPGA) or the like.

It needs to note that in the present specification, terms "comprise", "include" or any other variant thereof intends to cover non-exclusive containing, such that a process, method, object or device comprising a series of elements not only comprise those elements, but also comprise other elements not listed explicitly, or also comprise elements inherent to this process, method, object or device. Without more limitations, an element defined by an expression of "comprise a/an . . . " does not exclude that additional same element exists in the process, method, object and device comprising the element.

Finally, it needs to note that the above series of processes not only comprise processes performed in a time sequence according to the order described herein, but also comprise processes performed in parallel or separately in a non-time sequence.

According to the description of the above implementations, it is clear for those skilled in the art to known that the present disclosure can be realized by means of software together with necessary hardware platforms, or can be realized by only hardware. Based on such understanding, all or part of the technical solutions of the present disclosure that contribute to the background art can be reflected in a form of a computer software product. The computer software product can be stored in a storage media, such as ROM/RAM, magnetic disk, optical disk, etc., comprising several instructions, which are used to make one piece of computer equipment (it may be a personal computer, a server, or a network device, etc.) execute the method as disclosed in respective embodiments or some parts of the embodiments of the present disclosure.

The above are detailed description of the present disclosure. The specification applies a specific example to describe principles and implementations of the present disclosure. The description of the above embodiments is just used to help in understanding the principles and core concepts of the present disclosure. At the same time, for those ordinary skilled in the art, based on the concept of the present disclosure, change would occur to the specific implementations and application scopes. To sum up, the content of the present specification shall not be understood as a limitation to the present disclosure.

What is claimed is:

1. An image encoding method, comprising steps of:
   acquiring a first image and a plurality of second images;
   updating features of each second image of the plurality of second images to obtain corresponding update features;
   superposing the first image with the update features of each second image of the plurality of second images to generate superposed images;
   generating a plurality of prediction images according to the superposed images;
   determining difference features between each second image of the plurality of second images and a corresponding prediction image;
   outputting the superposed images and the difference features;
   wherein the updating and/or predicting adopts a respective convolutional neural network.

2. The image encoding method according to claim 1, comprising a step of:
   splitting an input original image into the first image and the plurality of second images.

3. An image encoding apparatus performing the image encoding method according to claim 1.

4. An image decoding method, comprising steps of:
receiving superposed images and difference features;
generating a plurality of prediction images according to the superposed images;
generating a plurality of second images according to each prediction image of the plurality of prediction images and the difference features;
updating each second image of the plurality of second images to obtain corresponding update features;
performing de-superposing on the superposed images according to the update features to obtain a first image;
outputting the plurality of second images and the first image;
wherein the updating and/or predicting adopts a respective convolutional neural network.

5. The image decoding method according to claim 4, comprising a step of:
joining the first image and the plurality of second images to obtain a decoded image.

6. An image decoding apparatus performing the image decoding method according to claim 4.

7. An image processing system, comprising:
an image encoding apparatus, comprising:
a first image input terminal, configured to acquire a first image;
a plurality of second image input terminals, configured to acquire a plurality of second images;
a first feature circuit, connected with the plurality of second image input terminals and configured to update features of each second image of the plurality of second images to obtain corresponding update features;
an image superposing circuit, connected with the first image input terminal and the first convolutional neural network circuit and configured to superpose the update feature of each second image of the plurality of second images with the first image to generate superposed images and output the superposed images;
a first prediction circuit, connected with the image superposing circuit and configured to generate a plurality of prediction images according to each of the superposed images;
an image difference acquisition circuit, connected with the plurality of second image input terminals and the prediction circuit and configured to determine difference features between each second image of the plurality of second images and a corresponding prediction image and output the difference features;
an encoder output interface, configured to output the superposed images and the difference features;
an image decoding apparatus, comprising: a superposed image input terminal, configured to receive the superposed images;
a difference feature input terminal, configured to receive the difference features;
a second prediction circuit, connected with the superposed image input terminal and configured to generate a plurality of prediction images according to the superposed images;
a de-difference circuit, connected with the difference feature input terminal and the prediction circuit and configured to generate a plurality of fourth images according to each prediction image of the plurality of prediction images and the difference features, and output the plurality of fourth images;
a second feature circuit, connected with the de-difference circuit and configured to update the plurality of fourth images to obtain corresponding update features; and
an image de-superposing circuit, connected with the superposed image input terminal and the second feature circuit and configured to perform de-superposing on the superposed images according to the update features to obtain a third image, and output the third image;
an output terminal, configured to output the plurality of fourth images and the third image.

8. The image processing system according to claim 7, wherein the image encoding apparatus further comprises:
a demuxer, connected with the first image input terminal and the plurality of second image input terminals and configured to split an input original image to obtain the first image and the plurality of second images.

9. The image processing system according to claim 8, wherein the demuxer is configured to split an original image into 2n images, a number of the first image is 1, a number of the second images is 2n−1, and n is an integer greater than 0.

10. The image processing system according to claim 7, wherein the image superposing circuit superposes the update features of each second image of the plurality of second images with the first image according to a superposing weight.

11. The image processing system according to claim 10, wherein the image superposing circuit is configured to multiply the first image by a first weight parameter to obtain a first product, multiply the update features by a second weight parameter to obtain a second product, and superpose the first product and the second product to generate an superposed image; where the first weight parameter is greater than 0, and a sum of the first weight parameter and the second weight parameter is 1.

12. The image processing system according to claim 7, wherein the image decoding apparatus further comprises:
a muxer, connected with the output terminal and configured to join the first image and the plurality of second images to obtain a decoded image and output the decoded image through a decoder output interface.

13. The image processing system according to claim 7, wherein the image de-superposing circuit is configured to perform de-superposing on the superposed images according to the update features and their superposing weights.

14. The image processing system according to claim 13, wherein the image de-superposing circuit is configured to multiply the update features by a second weight parameter to obtain a second product, remove the second product from the superposed images to obtain a first product, and divide the first product by a first weight parameter to obtain the first image; where the first weight parameter is greater than 0, and a sum of the first weight parameter and the second weight parameter is 1.

15. The image processing system according to claim 7, wherein the first prediction circuit is a second convolutional neural network circuit, the second prediction circuit is a third convolutional neural network circuit, the first feature circuit is a first convolutional neural network circuit, and the second feature circuit is a fourth convolutional neural network circuit.

16. The image processing system according to claim 7, further comprising a quantization apparatus connected with the image encoding apparatus and the image decoding apparatus respectively,
wherein the quantization apparatus is configured to receive the superposed images and the difference features output from the encoder output interface, and perform quantization process and inverse quantization process on the superposed images and the difference features to generate quantization superposed images and quantization difference features; and output the quantization superposed image and the quantization difference features to the superposed image input terminal and the difference feature input terminal of the image decoding apparatus.

17. The image processing system according to claim 7, wherein the quantization apparatus is configured to perform the quantization process on the superposed images and the difference features by utilizing an uniform scalar quantization USQ function, $$USQ(x) = \text{sign}(x)\left\lfloor \frac{x}{\delta} \right\rfloor$$

where $$\text{sign}(x) = \begin{cases} 1 & x > 0 \\ 0 & x = 0 \\ -1 & x < 0 \end{cases}, \left\lfloor \frac{x}{\delta} \right\rfloor$$

is a smallest integer smaller than x, and $\delta$ is a quantization parameter.

18. The image processing system according to claim 7, wherein the quantization apparatus is configured to perform the quantization process on an output q of the uniform scalar quantization USQ function by utilizing an inverse uniform scalar quantization InvUSQ function to generate the quantization superposed images and the quantization difference features, where $\text{InvUSQ}(q) = \text{sign}(q)(|q|+0.5)\delta$.

19. A training method for the image processing system according to claim 7, comprising:
    selecting a fixed quantization parameter;
    inputting a training image to the image processing system, adjusting weight values of respective filter circuits at respective convolutional layers in convolutional neural network circuits, and running a limited number of iterations to optimize a target function; and
    reducing the quantization parameter by a predetermined value, and repeating a training step of optimizing the target function if the quantization parameter is not smaller than a predetermined threshold; otherwise, the training method ends up.

20. The training method according to claim 19, wherein the target function is:

$$\theta = \underset{\theta}{\text{argmin}} MSE(X, OUT(X, \delta))$$

where $\theta$ represents a set of the weight values of the respective filter circuits at the respective convolutional layers in the convolutional neural network circuits, X represents an input training image, OUT represents an output image, and MSE is a mean square error function between the input training image and the output image.

* * * * *